United States Patent
Kim et al.

(10) Patent No.: US 9,460,717 B2
(45) Date of Patent: Oct. 4, 2016

(54) MOBILE TERMINAL AND CONTROLLING METHOD THEREOF USING VOICE RECOGNITION

(71) Applicant: LG ELECTRONICS INC., Seoul (KR)

(72) Inventors: Jonghwan Kim, Seoul (KR); Hojoong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 415 days.

(21) Appl. No.: 14/085,571

(22) Filed: Nov. 20, 2013

(65) Prior Publication Data

US 2014/0142953 A1 May 22, 2014

(30) Foreign Application Priority Data

Nov. 20, 2012 (KR) .................... 10-2012-0131617

(51) Int. Cl.
*G10L 15/26* (2006.01)
*G10L 15/22* (2006.01)

(52) U.S. Cl.
CPC .......... *G10L 15/22* (2013.01); *G10L 2015/223* (2013.01); *G10L 2015/225* (2013.01)

(58) Field of Classification Search
CPC ............................. G10L 15/26; G10L 15/30
USPC ............................... 704/8–10, 275
See application file for complete search history.

(56) References Cited

U.S. PATENT DOCUMENTS

| | | | | |
|---|---|---|---|---|
| 2003/0137537 A1* | 7/2003 | Guo | ................ | G10L 15/22 715/751 |
| 2003/0200080 A1* | 10/2003 | Galanes | ............ | H04M 1/72561 704/200 |
| 2004/0230434 A1* | 11/2004 | Galanes | ............ | H04M 3/42204 704/270.1 |
| 2004/0230637 A1* | 11/2004 | Lecoueche | .............. | G10L 15/20 709/200 |
| 2005/0091059 A1* | 4/2005 | Lecoeuche | ........ | H04M 1/72561 704/270.1 |
| 2008/0015864 A1* | 1/2008 | Ross | ................... | G10L 15/1822 704/275 |
| 2009/0204409 A1* | 8/2009 | Mozer | ..................... | G10L 15/30 704/275 |
| 2012/0245944 A1* | 9/2012 | Gruber | ................ | G06F 17/3087 704/270.1 |

* cited by examiner

*Primary Examiner* — Michael N Opsasnick
(74) *Attorney, Agent, or Firm* — Birch, Stewart, Kolasch & Birch, LLP

(57) ABSTRACT

A mobile terminal including a microphone configured to receive a voice input; a touchscreen configured to display information; and a controller configured to activate a voice recognition mode on the mobile terminal for receiving the voice input from the microphone, receive the voice input indicating a particular function on the mobile terminal is to be executed, execute the particular function indicated by the received voice input, if the voice recognition mode is interrupted while the particular function is being executed, determine whether the particular function is in a complete state or an incomplete state, if the particular function is in the incomplete state, display a display object corresponding to the particular function in the incomplete state, and resume the particular function and activate the microphone for receiving additional voice input to complete the particular function.

20 Claims, 13 Drawing Sheets

FIG. 6
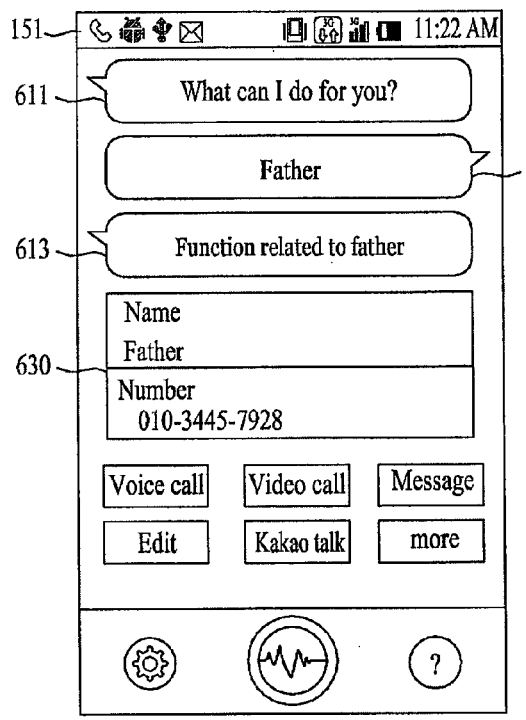
(a)
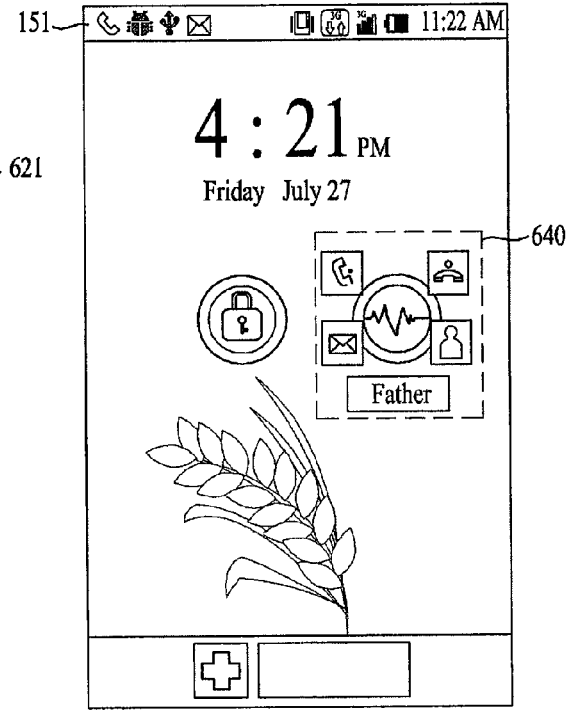
(b)
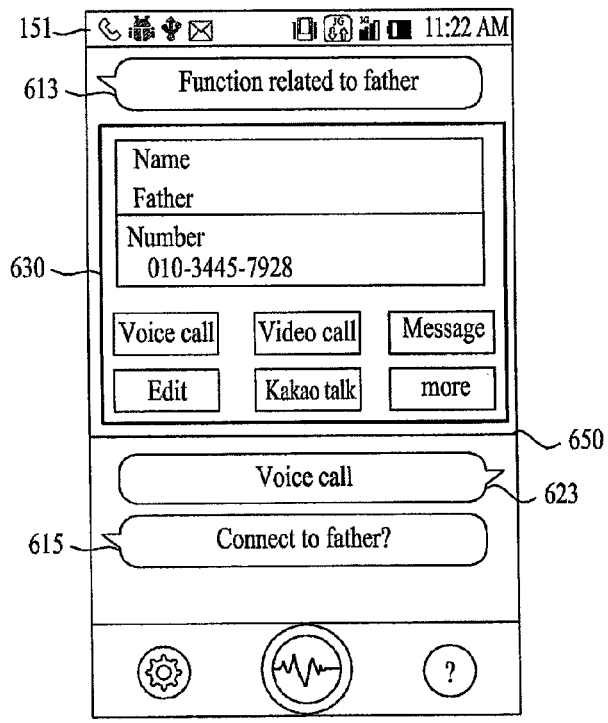
(c)
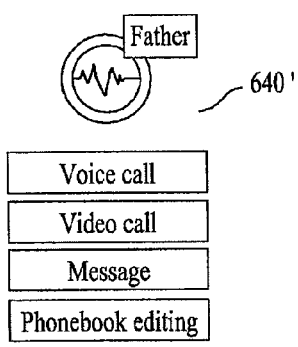
(d)

FIG. 8
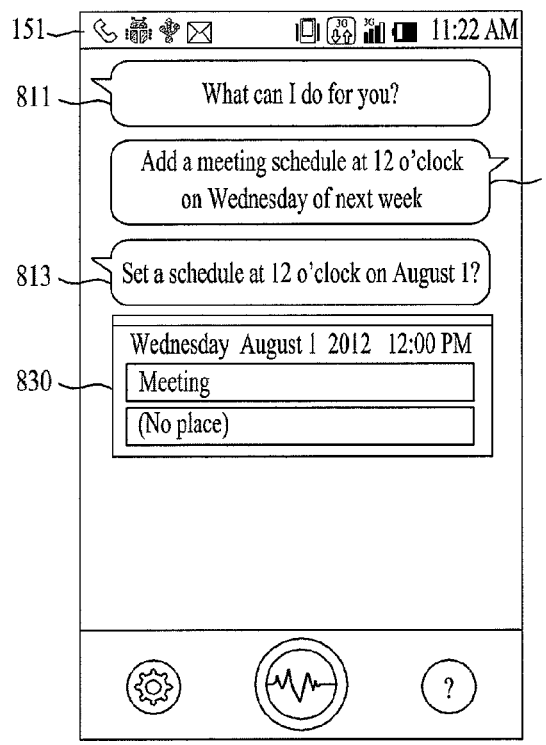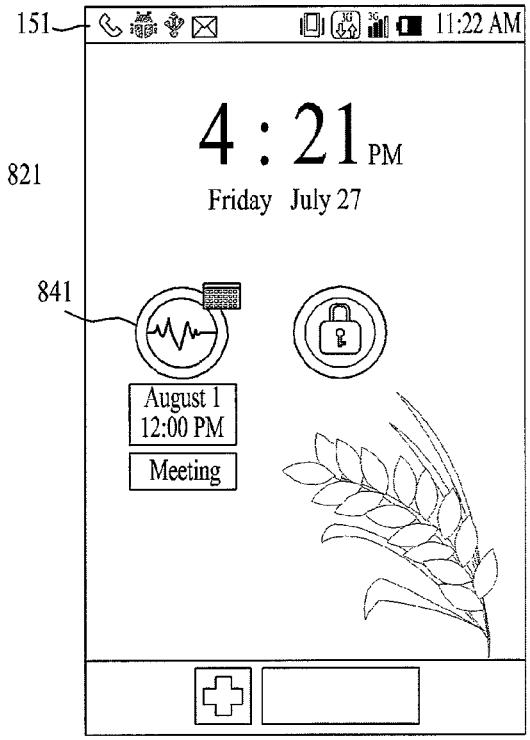
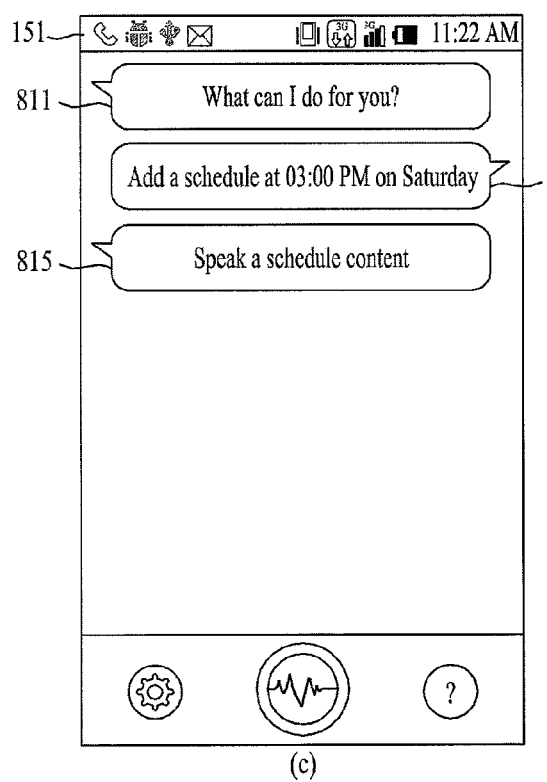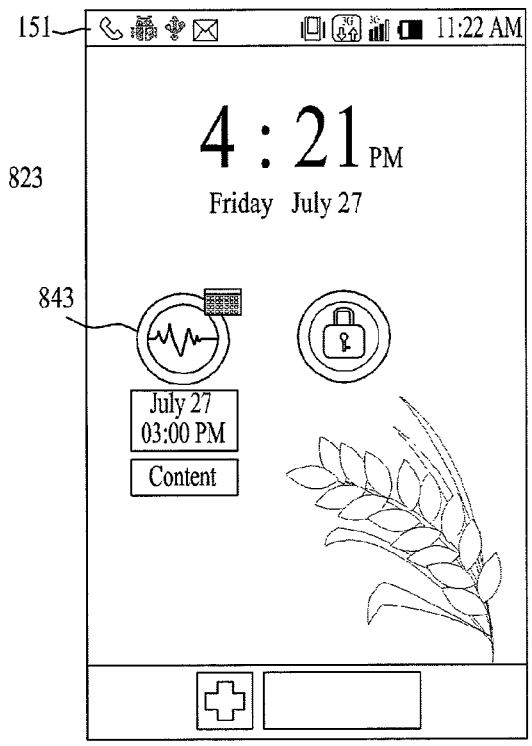

FIG. 9
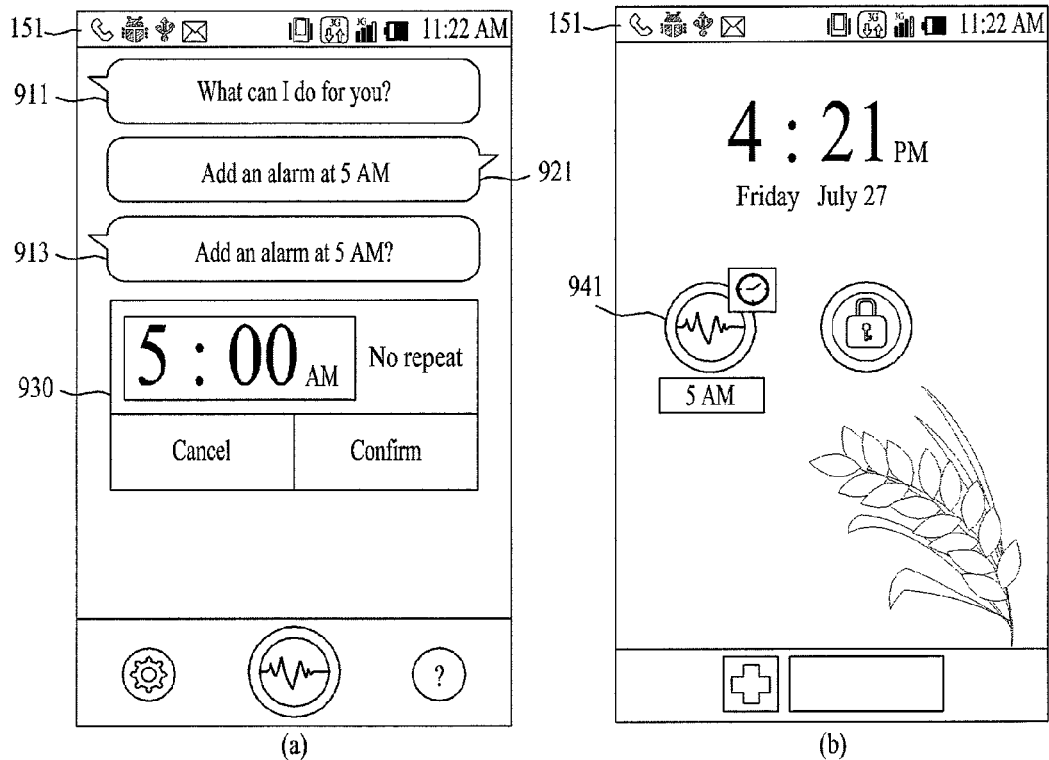
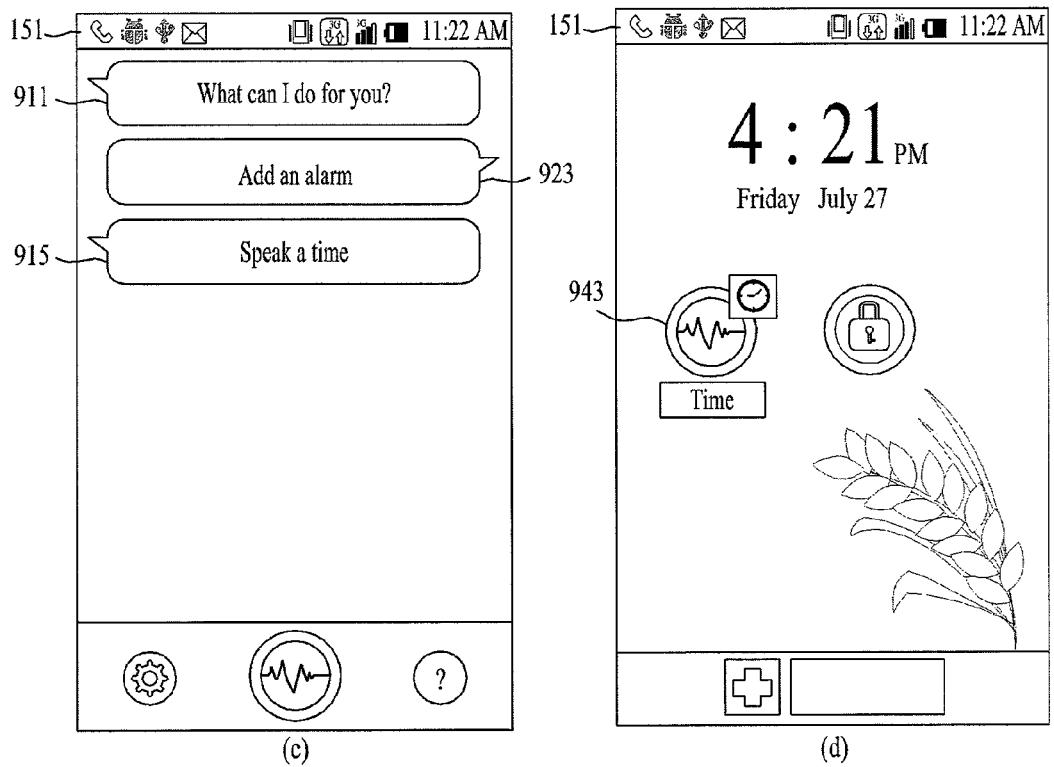

FIG. 10
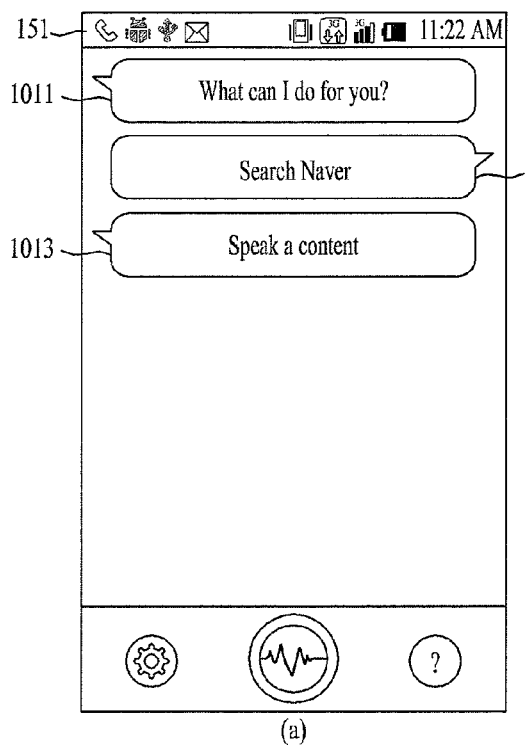
(a)
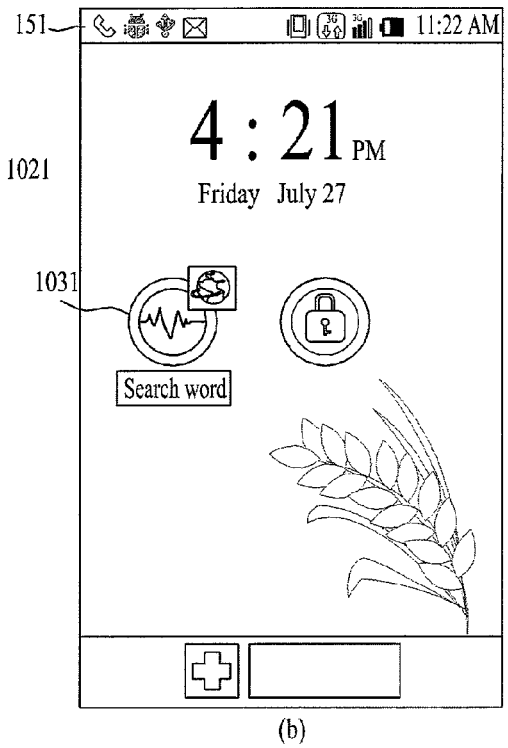
(b)
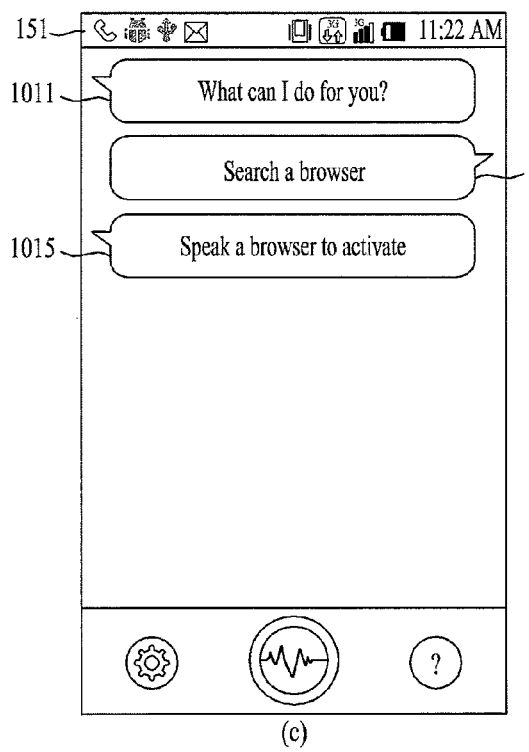
(c)
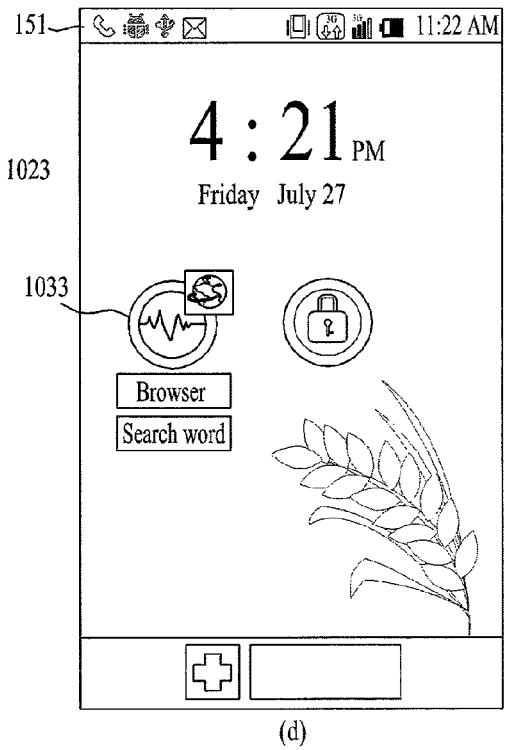
(d)

FIG. 11
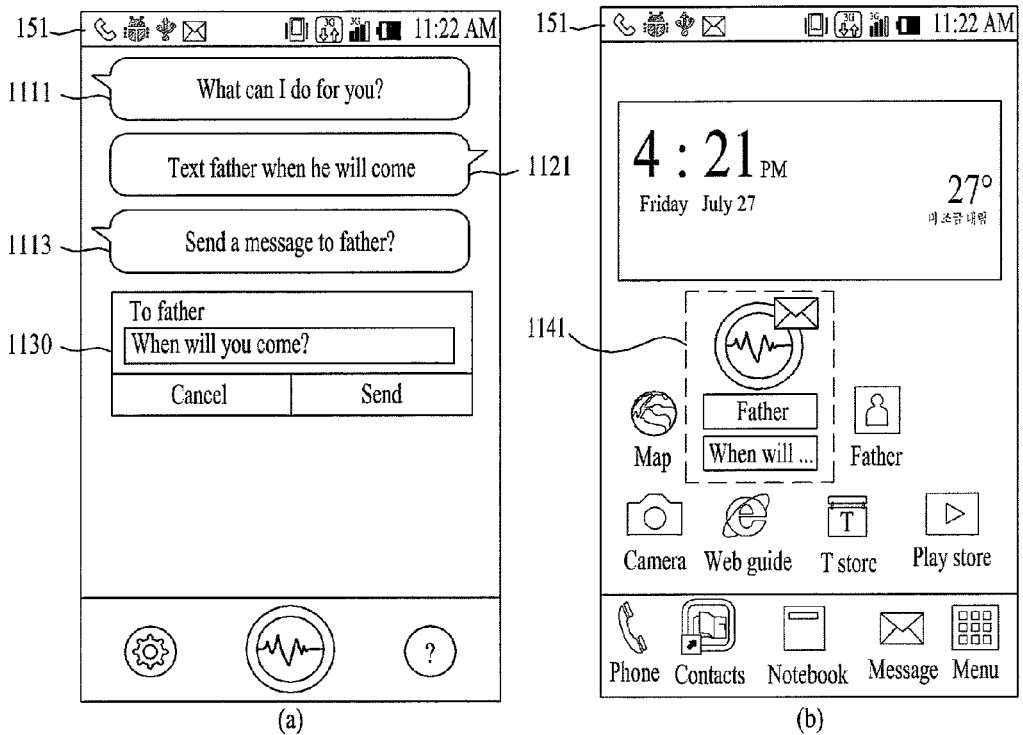
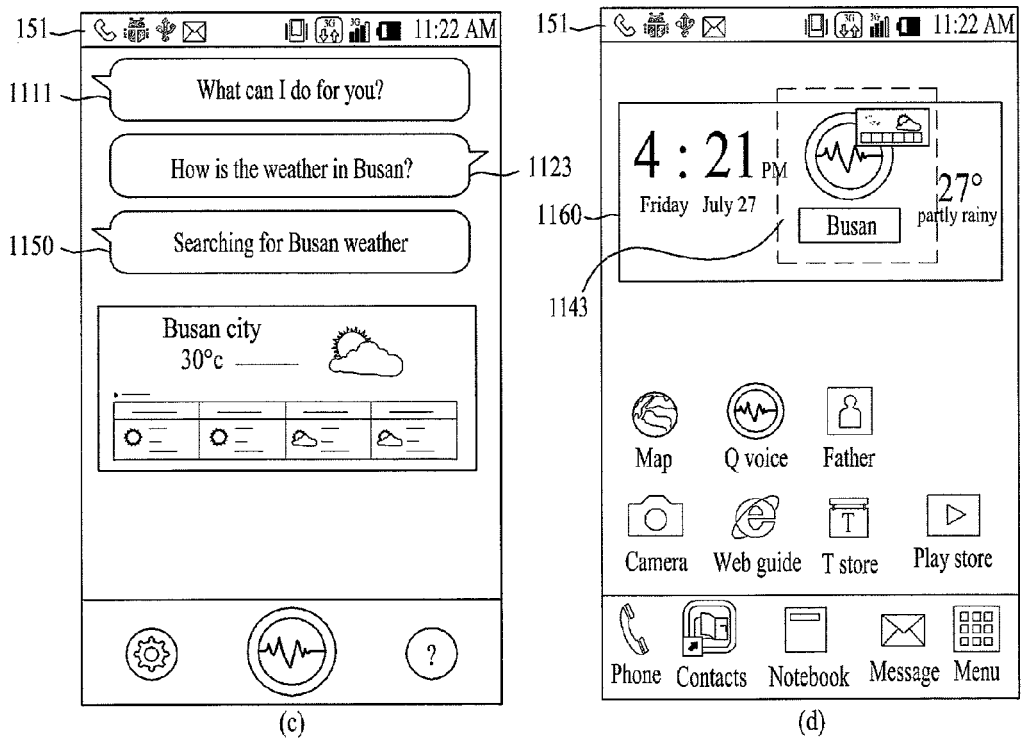

MOBILE TERMINAL AND CONTROLLING METHOD THEREOF USING VOICE RECOGNITION

Pursuant to 35 U.S.C. §119(a), this application claims the benefit of earlier filing date and right of priority to Korean Patent Application No. 10-2012-0131617, filed on Nov. 20, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof for resuming an interrupted voice recognition task conveniently when an incomplete task of a voice recognition mode is interrupted.

2. Discussion of the Related Art

Generally, terminals can be classified into mobile/portable terminals and stationary terminals. The mobile terminals can be further classified into handheld terminals and vehicle mount terminals. As functions of the terminal are becoming more diversified, the terminal is implemented as a multimedia player provided with composite functions such as photographing of photos or videos, playback of music or video files, game play, broadcast reception and the like for example.

Recently, mobile terminals provide various functions through a voice recognition function. However, the voice recognition function is limited in capabilities and thus can be inconvenient for the user.

SUMMARY OF THE INVENTION

Accordingly, one object of the present invention is directed to a mobile terminal and controlling method thereof that substantially obviate one or more problems due to limitations and disadvantages of the related art.

Another object of the present invention is to provide a mobile terminal and controlling method for providing a convenient voice recognition function.

Still another object of the present invention is to provide a mobile terminal and controlling method thereof, by which a voice recognition mode interrupted in a task-incomplete state can be conveniently resumed.

To achieve these objects and other advantages and in accordance with the purpose of the invention, as embodied and broadly described herein, a mobile terminal according to the present invention includes a microphone, a touchscreen, and a controller, if a voice recognition mode is interrupted while a voice recognition task is performed after activating the voice recognition mode, determining whether the voice recognition task is in a complete state, the controller, if the voice recognition task is in an incomplete state, creating a display object corresponding to the voice recognition task in the incomplete state, the controller, if the display object is displayed or selected, activating the microphone, the controller controlling the voice recognition task in the incomplete state to be resumed in response to a user voice input while the microphone is active.

In another aspect of the present invention, a method of controlling a mobile terminal according to the present invention includes the steps of activating a voice recognition mode, interrupting the voice recognition mode while a voice recognition task is performed in the activated voice recognition mode, determining whether the voice recognition task is in a complete state, if the voice recognition task is in an incomplete state as a result of the determining step, creating a display object corresponding to the voice recognition task in the incomplete state at a preset location, if the display object is displayed or selected, activating a microphone, and resuming the voice recognition task in the incomplete state in response to a user voice input while the microphone is active.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating another example of displaying a display object when a phone call task is interrupted in an incomplete state during a voice recognition mode in a mobile terminal according to one embodiment of the present invention;

FIG. 8 is a diagram illustrating one example of displaying a display object when a schedule adding task is interrupted in an incomplete state during a voice recognition mode in a mobile terminal according to one embodiment of the present invention;

FIG. 9 is a diagram illustrating one example of displaying a display object when an alarm setting task is interrupted in an incomplete state during a voice recognition mode in a mobile terminal according to one embodiment of the present invention;

FIG. 10 is a diagram illustrating one example of displaying a display object when an internet search task is interrupted in an incomplete state during a voice recognition mode in a mobile terminal according to one embodiment of the present invention;

FIG. 11 is a diagram illustrating one example of displaying a display object on a home screen when a voice recognition mode is interrupted in an incomplete state in a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and such teachings may apply equally to other types of terminals such as digital TV, desktop computers and so on.

Figure 1:
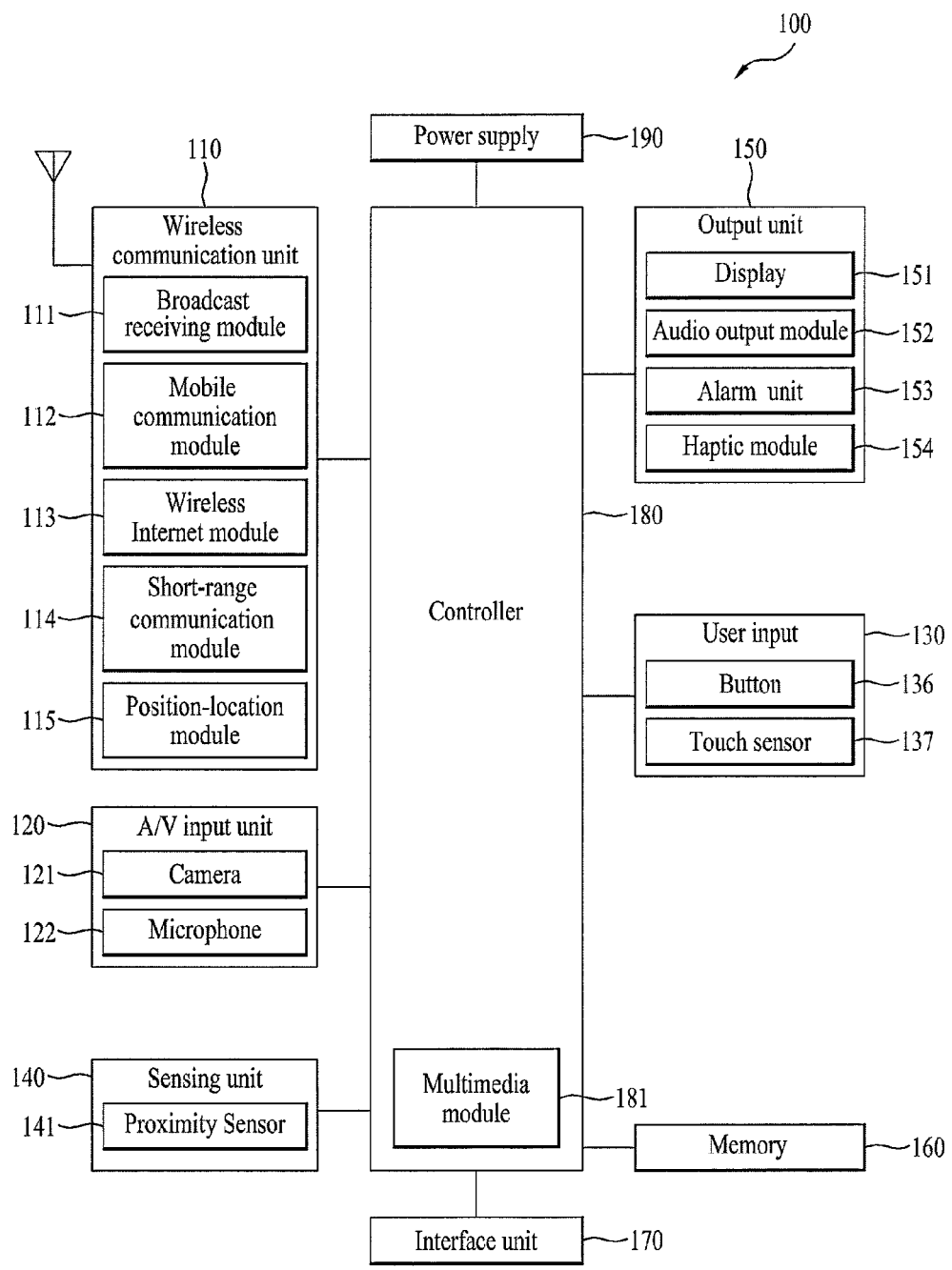
FIG. 1 is a block diagram of a mobile terminal according to one embodiment of the present invention.

FIG. 1 is a block diagram of the mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated during receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. The user input 130 can include a button 136 (physical or touch) and a touch sensor 37 for receiving a touch action.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may correspond to a position of the pointer vertically corresponding to the touchscreen when the pointer makes the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
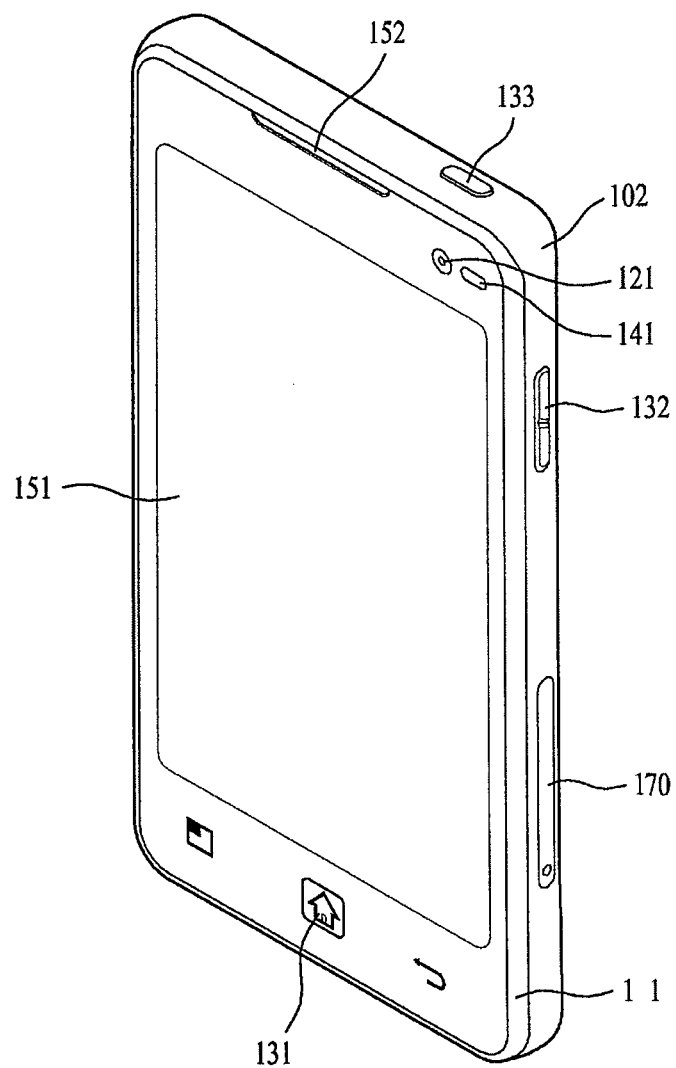
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, such disclosure may apply equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132. The proximity sensor 141 is also shown in the mobile terminal 100 in FIG. 2.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Combinable Processing of Voice Recognition

According to one embodiment of the present invention, when a voice recognition task is interrupted in a task-incomplete state in a mobile terminal, a mobile terminal and corresponding method informs a user of a presence of the corresponding voice recognition task and/or resumes the voice recognition task conveniently.

Figure 3:
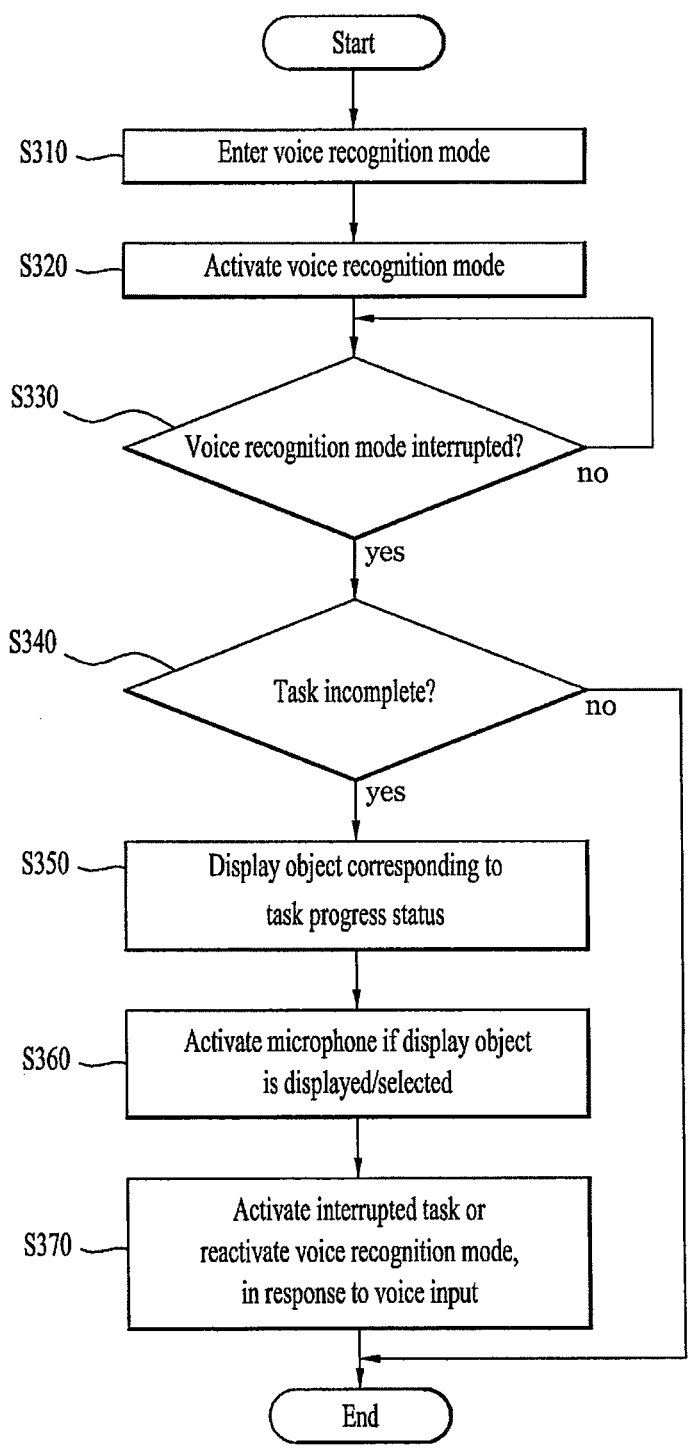
FIG. 3 is a flowchart illustrating one example of a method of resuming an interrupted voice recognition task using a display object when a voice recognition task in a task-incomplete state is interrupted in a mobile terminal according to one embodiment of the present invention.

In more detail, FIG. 3 is a flowchart illustrating one example of a method of resuming an interrupted voice recognition task using a display object when a voice recognition task in a task-incomplete state is interrupted in a mobile terminal according to one embodiment of the present invention.

Referring to FIG. 3, the controller 180 enters a voice recognition mode for recognizing an audio signal input through the microphone 122 as a control command (S310). For example, the controller 180 can enter the voice recognition mode in response to a prescribed command input (e.g., a selection of an icon of a shortcut to the voice recognition mode, etc.) through the user input unit 130 or the touchscreen or an occurrence of a specific event, by which the present invention is non-limited.

The voice recognition mode may be implemented with a single application. While the voice recognition mode is active, it can page at least one partial function of at least one different application or to deliver information on a result of a voice recognition in association with a different application.

Once the voice recognition mode is entered, the controller 180 activates a voice recognition mode operation (S320). In particular, the controller 180 activates the microphone 122, recognizes a voice input through the microphone 122, and then outputs a recognition result of a prescribed type (e.g., a text, an image, a combination of the text and image, etc.) to the touchscreen 151. Moreover, the controller 180 recognizes the recognition result as a command as well as outputs the recognition result, and may then activate a function corresponding to the recognized command or input the recognition result as a specific field value (e.g., time information, schedule content information, message content, etc.) that requires information input. To this end, the controller 180 may page at least one partial function of another application if necessary.

As mentioned in the forgoing description, while the voice recognition mode is operating, the voice recognition mode may be interrupted (S330). In this instance, the interruption of the voice recognition mode may be caused by selecting a back key button for the interruption of the voice recognition mode, an end key button, a home key button 131 for a function of a shortcut to a home screen or the like. The back key button or the end key button may include a virtual key button displayed on the touchscreen. Alternatively, the back key button or the end key button may include a hardware key button (e.g., a touch key button, etc.) provided to a mobile terminal body.

Further, an interrupted application may operate as a background application in a multitasking supportive operating system instead of being completely ended. The interruption of the voice recognition mode may correspond to a case of activating a different application (i.e., activation switching) in response to an event occurrence (e.g., alarm time expiration, call signal reception, etc.) or a user's command input. Moreover, if a voice input through the microphone 122 is not detected for prescribed duration in the voice recognition mode, the controller 180 can determine that the voice recognition mode is interrupted.

Once the voice recognition mode is interrupted (Yes in S330), the controller 180 can determine whether the voice recognition task is incomplete (S340). In determining whether the voice recognition task is complete or incomplete, while such a text/content editable function as SMS, email, SNS, IM (instant messenger), memo, schedule, alarm, search, multimedia editor and the like is active in the voice recognition mode, the voice recognition mode may be interrupted without performing such an activation operation as save, send, search, delete and the like after initiation of a new task or an editing task. Moreover, in performing a task, which requires information on a function, a target, a content and the like through the voice recognition mode, if the voice recognition mode is interrupted in shortage of one of the information, the controller 180 can determine that the corresponding task is incomplete or in an incomplete state.

If determining that the task is in a task-complete state (No in S340), the controller 180 can end the voice recognition mode or control the voice recognition mode to operate as a background. On the contrary, if determining that the task is in a task-incomplete state (Yes in S340), the controller 180 can control a display object corresponding to a task progress state to be displayed at a prescribed location (S350). In this instance, the display object may mean an object capable of visually informing a user of a presence of an incomplete voice recognition task using an icon, a text or a combination of the icon and text. Further, the location, at which the display object will be displayed may include one of a lock screen, a quick panel displayed on dragging down an indicator region at the top, a home screen, a main menu for providing an application icon list and the like.

Thereafter, the controller 180 can activate the microphone 122 while the display object is displayed or alternatively can activate the microphone 122 if the display object is selected once (S360). The controller 180 can also activate the microphone 122 while the display object is selected through a touch input or the like.

While the microphone 122 is active, if a user voice is input, the controller 180 can resume the corresponding task in response to the input voice or a progress state of the interrupted task (S370). In this instance, the resumption of the task may mean a final activation when the task progress state has a final activation confirmation only or that the insufficient information is obtained all through a user voice. Alternatively, the resumption of the task may mean that an interrupted voice recognition mode is reactivated to keep receiving inputs of the insufficient information to activate the corresponding task. In some cases, if the display object is selected, the voice recognition mode may be reactivated in the state at that time of the interruption.

In the following description, how a display object is displayed in response to a task progress status is explained in detail with reference to FIGS. 4 to 10. In FIGS. 4 to 10, assume that a display object is displayed on a lock screen. In this instance, the lock screen includes a screen that can be displayed if a prescribed command is input or a turned-off touchscreen is turned on again. While the lock screen is displayed, the controller 180 can generally receive or execute a predetermined command only. For example, the predetermined command may include one of an emergency call, a release command (e.g., a touch input of a specific pattern, a password input, etc.) input through a lock means for releasing the lock screen, a manipulation of a specific icon or widget displayed on the lock screen and the like. If the lock screen is released in response to the release command, a previous screen, which was displayed last right before the home screen or the touchscreen is turned off, can be displayed.

Figure 4:
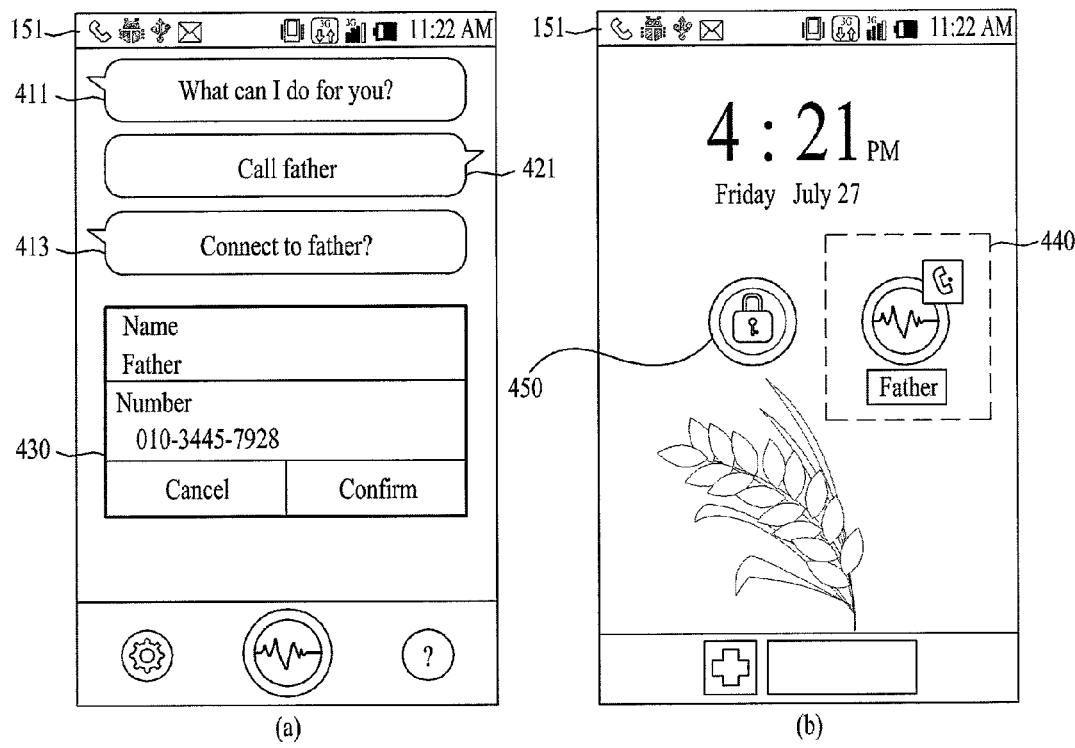
FIG. 4 is a diagram illustrating one example of displaying a display object when a phone call task is interrupted in an incomplete state during a voice recognition mode in a mobile terminal according to one embodiment of the present invention.

FIG. 4 is a diagram illustrating one example of displaying a display object when a phone call task is interrupted in an incomplete state during a voice recognition mode in a mobile terminal according to one embodiment of the present invention. In the following drawings including FIG. 4 and the like, assume a situation after a voice recognition mode has been entered in response to a prescribed command input. Further, assume that a user voice recognized on a user interface in a voice recognition mode and a corresponding response of the controller are output as a word balloon (message) thread to the touchscreen.

Referring to FIG. 4(a), as a voice recognition mode is entered, a user interface for the voice recognition mode is displayed on the touchscreen 151. First of all, the controller 180 can output a text 411 for requesting a voice input from a user. Hence, the user inputs a voice 'Call father' and the controller 180 then outputs a recognition result 421 of the input voice to the touchscreen 151. Moreover, the controller 180 recognizes the recognition result as a user command, determines that the user will use a voice call function for a target 'father', and can then output a text 413 for confirming a content of the determination. In doing so, a voice call application module 430 can be displayed on a bottom end of the touchscreen 151. A menu for determining whether to initiate a call connection can be displayed on the voice call application module 430 together with information on a recognized call counterpart.

In this instance, because a function of a voice call and information on a call counterpart required for performing the corresponding function are specified, if a user's intention for the final activation is confirmed, the controller 180 can complete one task. In doing so, before the user selects a confirmation menu of the voice call application module 430 with a touch input or inputs a voice 'confirm' in order to inform the controller 180 of the final activation intention, the voice recognition mode may be interrupted. Since the final activation intention is not confirmed, the controller 180 determines that the voice call task is in a task-incomplete state and displays a display object 440 corresponding to the interrupted incomplete voice call task on the lock screen (FIG. 4(*b*)). An unlock mechanism 450 can be further displayed on the lock screen.

The display object 440 can be displayed together with a phone icon indicating a recognized function and a text 'Father' indicating a target, as shown in the drawing, in order to indicate a task progress status. In this instance, the text 'Father' can be substituted with an image in the display object 440' if an image corresponding to 'Father' is set in a phonebook (FIG. 4(*c*)). Instead of the phone icon, a text 'phone' can be displayed in the display object 440" (FIG. 4(*d*)).

While the display object shown in one of FIGS. 4(*b*) to 4(*c*) is displayed or selected, the controller 180 can activate the microphone. If a final activation command is input through a voice, the controller 180 can initiate a call connection in direct. Moreover, when a display object is displayed or selected, the controller 180 can output an audio corresponding to a progress status of a corresponding task. For instance, if the function and target are completely specified, such an audio as 'connect a voice call to father?' can be output. Moreover, if the call is ended, the display object on the lock screen can disappear.

Figure 5:
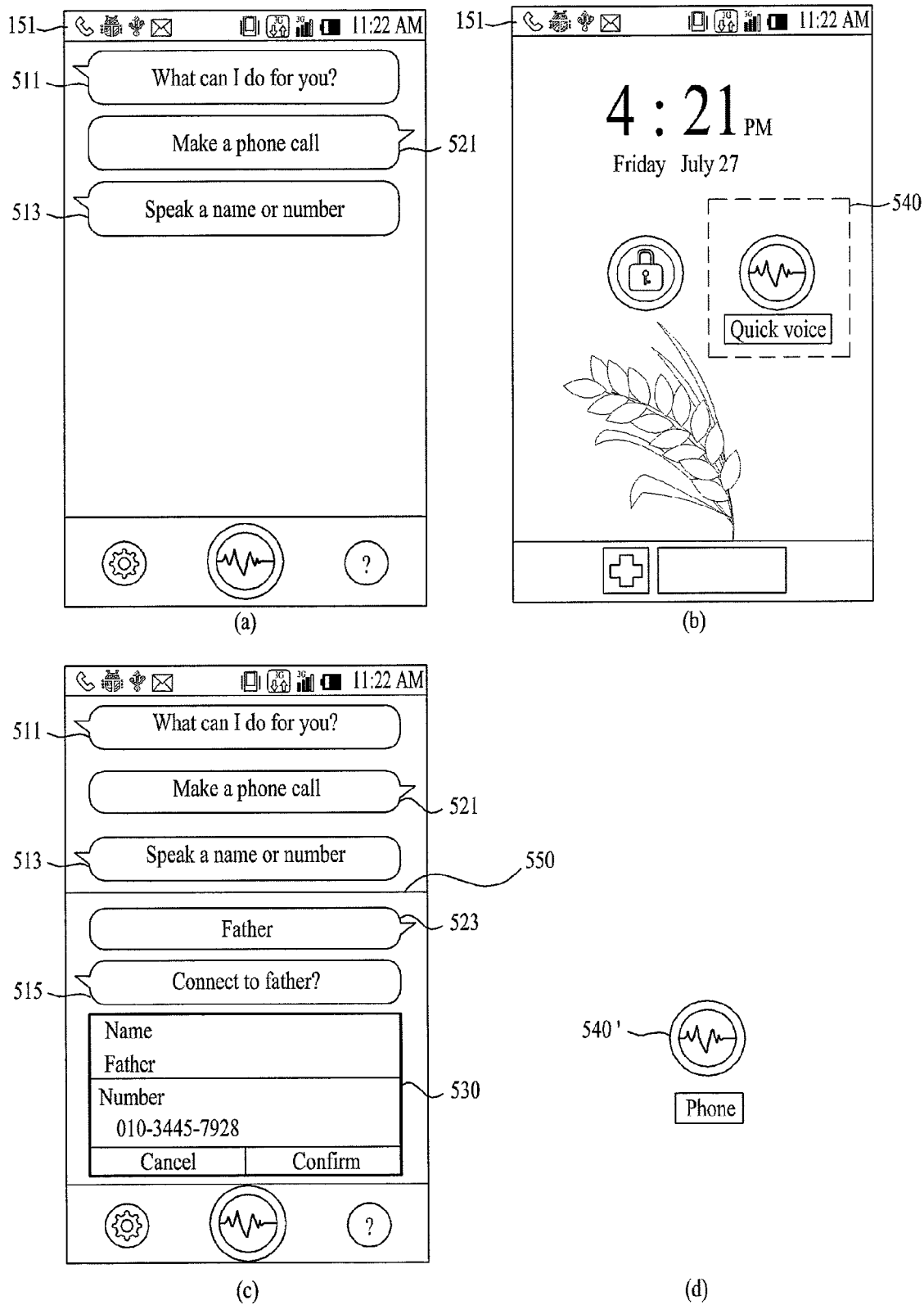
FIG. 5 is a diagram illustrating another example of displaying a display object when a phone call task is interrupted in an incomplete state during a voice recognition mode in a mobile terminal according to one embodiment of the present invention.

The following description describes specifying a function only without specifying a target with reference to FIG. 5. In particular, FIG. 5 is a diagram illustrating another example of displaying a display object when a phone call task is interrupted in an incomplete state during a voice recognition mode in a mobile terminal according to one embodiment of the present invention.

Referring to FIG. 5(*a*), as a voice recognition mode is entered, a user interface for the voice recognition mode is displayed on the touchscreen 151. First of all, the controller 180 can output a text 511 for requesting a voice input from a user. Hence, the user inputs a voice 'Make a phone call' and the controller 180 then outputs a recognition result 521 of the input voice to the touchscreen 151. Moreover, the controller 180 recognizes the recognition result as a user command, determines that the user will use a voice call function, and then outputs a text 513 for making a request for counterpart information required for the voice call function to the user.

If the voice recognition mode is interrupted, such that a counterpart of the voice call is not specified, the controller 180 determines that the voice call task is in an incomplete state and then displays a display object 540 corresponding to the interrupted incomplete voice call task on the lock screen (FIG. 5(*b*)). In this instance, the display object 540 can include a Quick Voice icon indicating the recognized function in order to indicate a task progress status.

While the display object is displayed or as the display object is selected, the controller 180 can activate the microphone. If a user voice is input, referring to FIG. 5(*c*), the voice recognition mode can be reentered. Of course, if the display object is selected through a touch input without a user voice input, the controller 180 can reenter the voice recognition mode in direct. In the reentered voice recognition mode, a recognition result corresponding to the newly input user voice can be displayed in continuation with the task progress statuses 511 to 513 previous to the interruption. For instance, if the newly input user voice includes 'Father', the controller 180 outputs a text 523 corresponding to the recognition result, determines 'Father' as a counterpart of the voice call, and then outputs a text 515 for confirming the determined content.

Further, a voice call application module 530 can be displayed on a bottom end of the touchscreen 151. In this instance, the controller 180 can display an indicator 550 indicating a voice recognition mode interrupted point on the user interface. The rest of steps after obtaining all information for the voice call are similar to the former description. Meanwhile, referring to FIG. 5(*d*), a phone icon can be substituted with a text in the display object 540'.

The following description describes specifying a target only without specifying a function in detail with reference to FIG. 6. In particular, FIG. 6 is a diagram for further example of displaying a display object when a phone call task is interrupted in an incomplete state during a voice recognition mode in a mobile terminal according to one embodiment of the present invention.

Referring to FIG. 6(*a*), as a voice recognition mode is entered, a user interface for the voice recognition mode is displayed on the touchscreen 151. First of all, the controller 180 can output a text 611 for requesting a voice input from a user. Hence, the user inputs a voice 'Father' and the controller 180 then outputs a recognition result of the input voice as a text 621 to the touchscreen 151. Moreover, the controller 180 recognizes the recognition result as a user command, determines that the user will use a random function for a target called 'Father', and then outputs a response text 613, and information on the corresponding target including a list 630 of functions executable for it.

If the voice recognition mode is interrupted, a function for the specified target is not specified, and the controller 180 determines that the task for 'Father' is in an incomplete state and then displays a display object 640 corresponding to the interrupted incomplete voice call task on the lock screen (FIG. 6(*b*)). In this instance, the display object 640, as shown in the drawing, can include an icon corresponding to each of the functions executable for the corresponding target together with a text indicating the recognized target in order to indicate a task progress status.

While the display object is displayed or as the display object is selected, the controller 180 can activate the microphone 122. If a user voice is input, referring to FIG. 6(*c*), the controller 180 can reenter the voice recognition mode. In the reentered voice recognition mode, a recognition result corresponding to the newly input user voice can be displayed in continuation with the task progress statuses 613 and 630 previous to the interruption. For instance, if the newly input user voice includes 'voice call', the controller 180 outputs a text 623 corresponding to the recognition result, determines 'voice call' as a function to be performed for 'Father', and then outputs a text 615 for receiving a confirmation of the determined content.

Thus, a voice call application module (not shown in the drawing) can be displayed on a bottom end of the touchscreen 151. In this instance, the controller 180 can display an indicator 650 indicating a voice recognition mode interrupted point on the user interface. The rest of steps after obtaining all information for the voice call can refer to the former description. Meanwhile, referring to FIG. 6(*d*), icons corresponding to the executable functions can be substituted with texts in the display object 640'.

Figure 7:
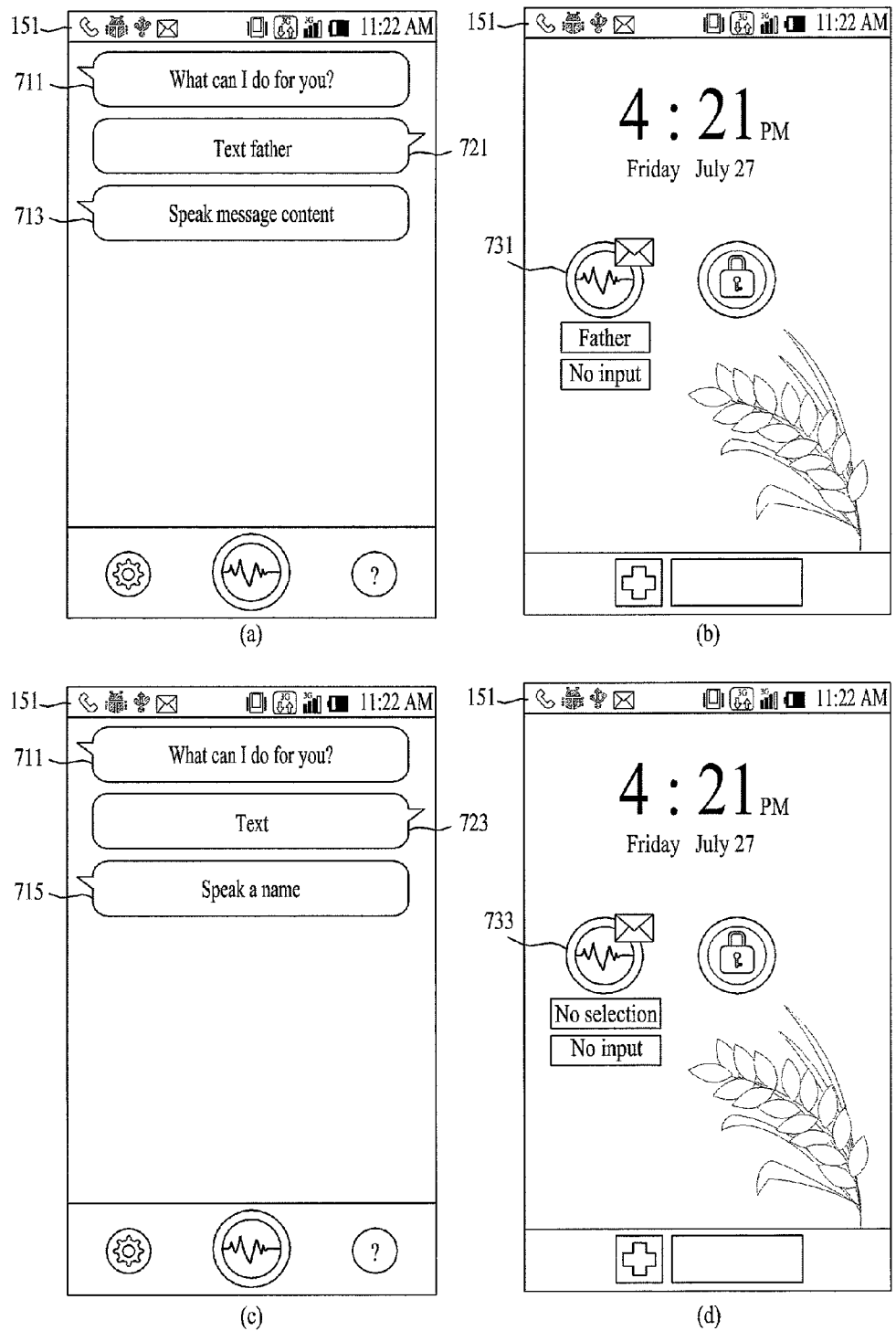
FIG. 7 is a diagram illustrating one example of displaying a display object when a text message sending task is interrupted in an incomplete state during a voice recognition mode in a mobile terminal according to one embodiment of the present invention.

The following description describes a method of displaying information required for completing a task on a display object with reference to FIG. 7. In particular, FIG. 7 is a diagram illustrating one example of displaying a display object when a text message sending task is interrupted in an incomplete state during a voice recognition mode in a mobile terminal according to one embodiment of the present invention.

Referring to FIG. 7(a), as a voice recognition mode is entered, a user interface for the voice recognition mode is displayed on the touchscreen 151. First of all, the controller 180 can output a text 711 for requesting a voice input from a user. Hence, the user inputs a voice 'Text father' and the controller 180 then outputs a recognition result of the input voice as a text 721 to the touchscreen 151. Moreover, the controller 180 recognizes the recognition result as a user command, determines that the user will send a text message to a target called 'father', and then outputs a text 713 for requesting a user to input a message content.

If the voice recognition mode is interrupted, a content of the text message is not specified, and the controller 180 determines that the text sending task is in an incomplete state and then displays a display object 731 corresponding to the interrupted incomplete text message task on the lock screen (FIG. 7(b)). In this instance, the display object 731, as shown in the drawing, can include a message icon indicating a task progress status, a text indicating a message sent target and a text 'no input' indicating a presence of one non-input information in order to indicate a task progress status.

If the user speaks a function as the text 723 only, referring to FIG. 7(c), the controller 180 can make a request 715 for a transmission target to the user. Thus, if the voice recognition is interrupted, the transmission target and content of the text message are not specified yet, and the controller 180 determines that the text sending task is in an incomplete state and then displays a display object 733 corresponding to the interrupted incomplete text sending task on the lock screen (FIG. 7(d)). Further, the display object 733, as shown in the drawing, can include a message icon indicating a recognized function and texts 'no input' and 'no selection', which indicate there are two non-input information, in order to indicate the task progress status. The resumption of a task using a display object is similar to the former description.

In the following description, schedule adding task is explained in detail with reference to FIG. 8. In particular, FIG. 8 is a diagram illustrating one example of displaying a display object when a schedule adding task is interrupted in an incomplete state during a voice recognition mode in a mobile terminal according to one embodiment of the present invention.

Referring to FIG. 8(a), as a voice recognition mode is entered, a user interface for the voice recognition mode is displayed on the touchscreen 151. First of all, the controller 180 can output a text 811 for requesting a voice input from a user. Hence, the user inputs a schedule content and a time and the controller 180 then outputs a recognition result of the inputs as a text 821 to the touchscreen 151. Moreover, the controller 180 recognizes the recognition result as a user command, determines that the user will add a schedule of a content including 'meeting' at 12:00 on Wednesday of a next week', and then outputs a text 813 for receiving a confirmation of the determined content. Further, a schedule management application module 830 can be displayed on a bottom end of the touchscreen 151. In this instance, the recognized content and time information of the schedule can be displayed on the schedule management application module 830.

Thus, in a situation that all information for the schedule addition are specified, the voice recognition mode may be interrupted before a final activation intention of the user is confirmed. Since the final activation intention is not confirmed, the controller 180 determines that the schedule adding task is in an incomplete state and then displays a display object 841 corresponding to the interrupted incomplete schedule adding task on the lock screen (FIG. 8(b)). The display object 841, as shown in the drawing, can include an icon corresponding to a schedule management function, a text corresponding to the recognized time information and a text corresponding to the recognized content information. The rest of steps for requesting the final activation intention of the user only are similar to the former description with reference to FIG. 4.

If the user speaks the function and time 823 only, referring to FIG. 8(c), the controller can make a request 815 for a content of the schedule to the user. If the voice recognition mode is interrupted, the content of the schedule is not specified, and the controller 180 determines that the schedule adding task is in an incomplete state and then displays a display object 843 corresponding to the interrupted incomplete schedule adding task on the lock screen (FIG. 8(d)). Since the display object 843 is in shortage of the information on the schedule content unlike the case shown in FIG. 8(b), a text 'content' can be displayed instead of the text 'meeting'.

Next, a schedule adding task is explained in detail with reference to FIG. 9. In particular, FIG. 9 is a diagram illustrating one example of displaying a display object when an alarm setting task is interrupted in an incomplete state during a voice recognition mode in a mobile terminal according to one embodiment of the present invention.

Referring to FIG. 9(a), as a voice recognition mode is entered, a user interface for the voice recognition mode is displayed on the touchscreen 151. First of all, the controller 180 can output a text 911 for requesting a voice input from a user. Hence, the user inputs a voice indicating that an alarm is to be added at a specific time and the controller 180 then outputs a recognition result of the input as a text 921 to the touchscreen 151. Moreover, the controller 180 recognizes the recognition result as a user command, determines that the user will add an alarm at '05:00 A.M.', and then output a text 913 for receiving a confirmation of the determined content. Further, the controller 180 can display an alarm application module 930 on a bottom end of the touchscreen 151. In this instance, the recognized alarm time, the everyday repetition setting and the like can be displayed on the alarm application module 930.

Thus, in a situation that all information for the alarm setting are specified, the voice recognition mode may be interrupted before a final activation intention of the user is confirmed. Since the final activation intention is not confirmed, the controller 180 determines that the alarm setting task is in an incomplete state and then displays a display object 941 corresponding to the interrupted incomplete alarm setting task on the lock screen (FIG. 9(b)). The display object 941, as shown in the drawing, can include an icon corresponding to an alarm setting and a text corresponding to the recognized time. The rest of steps for requesting the final activation intention of the user only are similar to the former description with reference to FIG. 4.

If the user speaks the function 923 only, referring to FIG. 9(c), the controller can make a request 915 for an alarm time to the user. If the voice recognition mode is interrupted, the time of the alarm is not specified, and the controller 180 determines that the alarm setting task is in an incomplete state and then displays a display object 943 corresponding to the interrupted incomplete alarm setting task on the lock screen (FIG. 9(*d*)). Since the display object 943 is in shortage of the information on the alarm time unlike in FIG. 9 (*b*), a text 'time' can be displayed instead of the text '05:00 A.M.'.

Meanwhile, a type of the insufficient information can be displayed on a display object. This is described with reference to FIG. 10 assuming an Internet search task as follows. In particular, FIG. 10 is a diagram illustrating one example of displaying a display object when an internet search task is interrupted in an incomplete state during a voice recognition mode in a mobile terminal according to one embodiment of the present invention.

Referring to FIG. 10(*a*), as a voice recognition mode is entered, a user interface for the voice recognition mode is displayed on the touchscreen 151. First of all, the controller 180 can output a text 1011 for requesting a voice input from a user. Hence, the user inputs a voice indicating 'Naver search' and the controller 180 then outputs a recognition result of the input as a text 1021 to the touchscreen 151. Moreover, the controller 180 recognizes the recognition result as a user command, determines that the user will activate an internet search function using a browser 'Naver', and then outputs a text 1013 for receiving the user to input a search word.

If the voice recognition mode is interrupted, the search word is not confirmed, and the controller 180 determines that a text sending task is in an incomplete state and then displays a display object 1031 corresponding to the interrupted search task on the lock screen (FIG. 10(*b*)). The display object 1031, as shown in the drawing, can include an internet icon indicating a recognized function and a text 'search word' indicating a type of the insufficient information.

If the user speaks the search function 1023 only, referring to FIG. 10(*c*), the controller can make a request 1015 for a browser to use for a search to the user. If the voice recognition mode is interrupted, the browser and keyword for performing the search are not specified, and the controller 180 determines that the search task is in an incomplete state and then displays a display object 1033 corresponding to the interrupted incomplete text sending task on the lock screen (FIG. 10(*d*)). Since the display object 1033 is in shortage of the information on the browser unlike in FIG. 10(*b*), a text 'browser' can be additionally displayed on the display object 1033.

So far, the description has been made on the assumption that a display object corresponding to an incomplete voice recognition task is displayed on a lock screen. In the following description, displaying a display object on a home screen is explained in detail with reference to FIG. 11.

In particular, FIG. 11 is a diagram illustrating one example of displaying a display object on a home screen when a voice recognition mode is interrupted in an incomplete state in a mobile terminal according to one embodiment of the present invention. Referring to FIG. 11(*a*), as a voice recognition mode is entered, a user interface for the voice recognition mode is displayed on the touchscreen 151. First of all, the controller 180 can output a text 1111 for requesting a voice input from a user. Hence, the user inputs a voice 'Text father when he will come' and the controller 180 then outputs a recognition result of the inputs as a text 1121 to the touchscreen 151.

Moreover, the controller 180 recognizes the recognition result as a user command, determines that the user will send a text message having a content of 'when he will come' to a target 'father', and then outputs a text 1113 for receiving a confirmation of the determined content. In addition, a text message application module 1130 can be displayed on a bottom end of the touchscreen 151. In this instance, a menu for determining whether to send a message can be displayed on the text message application module 1130 together with information on the recognized call counterpart and message content.

If the voice recognition mode is interrupted before a text message send command is input (i.e., while the task is in an incomplete state), referring to FIG. 11(*b*), a corresponding display object 1141 can be displayed on a home screen. In this instance, the display object 1141 may be arranged as a simple icon or widget on the home screen and include an icon corresponding to a text message function, a recognized counterpart and a text corresponding to a content.

Even if the display object is displayed on the home screen, if the corresponding object is selected or while the corresponding object is displayed, the controller 180 activates the microphone, recognizes a user voice in addition, and then resumes the interrupted voice recognition task.

On the other hand, if a task related widget active in the voice recognition mode is already arranged on the home screen, the display object in accordance with the task interruption may be displayed on the related widget. For instance, as a weather search task progresses into statuses 1111, 1123 and 1115, while a weather application module 1150 is displayed (FIG. 11(*c*)), if the voice recognition mode is interrupted, a display object 1143 corresponding to the weather search task can be displayed on a weather widget 1160 (FIG. 11(*d*)).

Next, displaying a display object in accordance with an interruption of an incomplete voice recognition task on a quick panel is explained in detail with reference to FIG. 12. In particular, FIG. 12 is a diagram illustrating one example of displaying a display object on a quick panel when a voice recognition mode is interrupted in an incomplete state in a mobile terminal according to one embodiment of the present invention.

Figure 12:
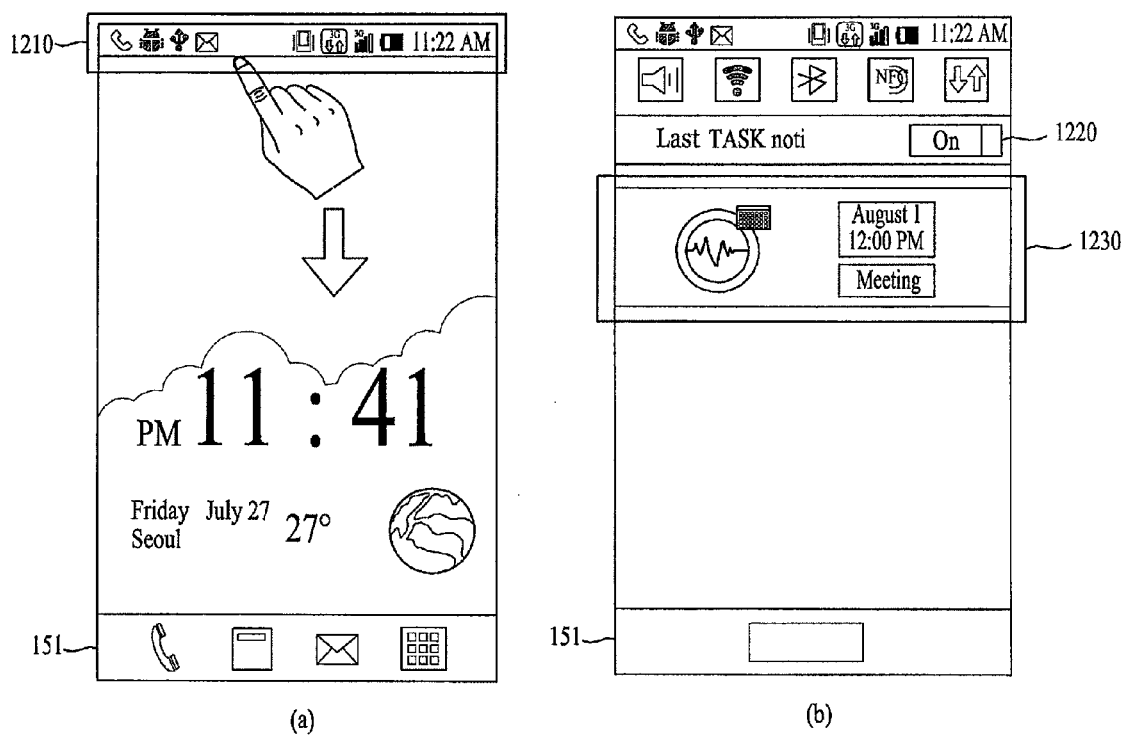
FIG. 12 is a diagram illustrating one example of displaying a display object on a quick panel when a voice recognition mode is interrupted in an incomplete state in a mobile terminal according to one embodiment of the present invention.

In FIG. 12, assume when a voice recognition mode is interrupted in the situation shown in FIG. 8(*a*). In this instance, a display object in accordance with the interruption can be displayed on a quick panel appearing when a prescribed touch input is applied to an indicator region. In particular, the indicator region includes a region that is always displayed on a top end of the touchscreen except when an application is activated as a full screen. Further, indicators indicating various state information (e.g., a current hour, a battery state, an event occurrence history, etc.) related to operations of the mobile terminal can be displayed on the indicator region.

The quick panel generally corresponds to a screen layer rolling down like a curtain if the indicator region is dragged down. Also, various kinds of event related information can be displayed on the quick panel. As the quick panel is paged, a screen previously displayed below the indicator region on the touchscreen is blocked by an indication region. Yet, transparency may be given to the indication region depending on settings. A plurality of toggle icons for determining whether to use various functions (e.g., Wi-Fi, Bluetooth, data packet communication, etc.) of the mobile terminal may be arranged on a quick panel top depending on an operating system. Further, a control menu (e.g., a play button of a music player, etc.) for controlling some functions of an application may be displayed on the quick panel top.

Referring to FIG. 12, if a touch-drag in bottom direction is applied to an indicator region 1210 (FIG. 12(*a*)), a quick panel can be displayed (FIG. 12(b)). Also, a display object 1230 can be displayed on the quick panel. Moreover, a menu 1220 for determining whether to use the display object in accordance with an interruption of an incomplete voice recognition task according to the present invention may be arranged on the quick panel.

Meanwhile, if the microphone is activated in repose to a selection of a display object or keeps active during displaying the display object, a power consumption may increases or a malfunction may occur, which is irrespective of when the microphone is active only while the display object is selected. Hence, it can activate the microphone during a prescribed time starting from a timing point of starting to display the display object or a timing point of selecting the display object only. Yet, if the microphone is activated during the prescribed time only, it is difficult for a user to recognize start and end points of the corresponding prescribed time. Hence, a method of visually informing the user when the corresponding time starts and ends is required. This is described in detail with reference to FIG. 13 as follows.

Figure 13:
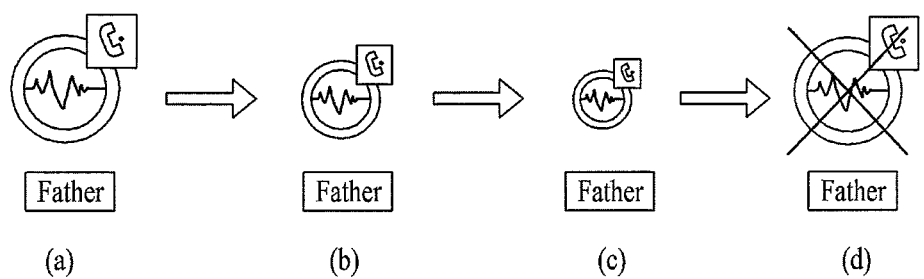
FIG. 13 is a diagram illustrating one example of a method of indicating a microphone-active time in a mobile terminal according to one embodiment of the present invention.

FIG. 13 is a diagram illustrating one example of a method of indicating a microphone-active time in a mobile terminal according to one embodiment of the present invention. In FIG. 13, assume that a display object is created in response to an interruption of a voice recognition mode in the situation shown in FIG. 4(a) for example.

Referring to FIG. 13, as the microphone is activated right after initially displaying a display object or right after selecting the display object, shapes of the display object may change (e.g., decrease in size), as shown in FIGS. 13(a) to 13(c), in time-elapsing order. If a preset microphone active time expires, referring to FIG. 13(d), the shape of the display object may change into a shape indicating that the microphone is deactivated. The shapes of the display object shown in FIG. 3 are exemplary, by which a method of displaying a microphone-active time of a display object according to the present invention is non-limited. For instance, any shape capable of visually representing the elapse and expiration of the active time can be accepted by the present invention.

According to the above-described embodiments of the present invention, when a text is output in a voice recognition mode in response to a recognition result of a user voice or for a user voice input request, the controller 180 can output an audio or voice corresponding to the text through the audio output unit 152. The controller 180 can control the audio or voice to be output only without outputting (or displaying) the corresponding text.

Accordingly, the present invention provides the following advantages. First, the present invention can provide various kinds of convenient function through voice recognition. Secondly, when a voice recognition task in a task-incomplete state is interrupted, the present invention facilitates the interrupted voice recognition task to be resumed using a display object situated at a prescribed location.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include other type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a microphone configured to receive a voice input;
   a touchscreen configured to display information; and
   a controller configured to:
   activate a voice recognition mode on the mobile terminal for receiving the voice input from the microphone,
   receive the voice input via the microphone, and execute a particular function related to the received voice input,
   if the voice recognition mode is interrupted and the microphone is deactivated while the particular function is being executed, determine whether the particular function is in a complete state or an incomplete state,
   if the particular function is in the incomplete state, display a display object informing that the particular function is in the incomplete state by a deactivation of the microphone, and
   activate the microphone for receiving additional voice input to complete the particular function when the display object is selected by a user.

2. The mobile terminal of claim 1, wherein the controller is further configured to determine that the particular function is in the incomplete state when saving, deletion or transmission of the particular function is not complete.

3. The mobile terminal of claim 1, wherein the controller is further configured to determine that the particular function is in the incomplete state if at least one of a task, content, target and a presence or non-presence of a final activation for the particular function is not specified.

4. The mobile terminal of claim 1, wherein the controller is further configured to display the display object on one of a home screen, a lock screen, a quick panel and a main menu.

5. The mobile terminal of claim 1, wherein the display object includes at least one of text, an image and an icon for indicating information about the particular function previously recognized before the voice recognition mode is interrupted.

6. The mobile terminal of claim 1, wherein the display object includes at least one of text, an image and an icon for indicating information about the particular function not obtained before the interruption of the voice recognition mode.

7. The mobile terminal of claim 1, wherein the controller is further configured to resume the particular function and activate the microphone when the display object is displayed on the touchscreen.

8. The mobile terminal of claim 1, wherein the controller is further configured to only resume the particular function and activate the microphone during a prescribed time starting from a timing point of initially displaying or selecting the display object.

9. The mobile terminal of claim 8, wherein the controller is further configured to change a visual effect to the display object based on an elapse of the prescribed time.

10. The mobile terminal of claim 1, wherein the controller is further configured to display a recognition result for each voice input in an active state of the voice recognition mode as a message thread.

11. The mobile terminal of claim 1, wherein the controller is further configured to resume the particular function and activate the voice recognition mode if new voice input is input through the microphone in response to the display or selection of the display object.

12. The mobile terminal of claim 11, wherein when the voice recognition mode is activated, the controller is further configured to display information on the particular function progressing before the interruption of the voice recognition mode on the touchscreen.

13. The mobile terminal of claim 1, further comprising:
an audio output unit,
wherein when the display object is displayed or selected, the controller is further configured to output audio requesting the user to input information required for completing the particular function.

14. A method of controlling a mobile terminal, the method comprising:
activating, via a controller of the mobile terminal, a voice recognition mode on the mobile terminal for receiving the voice input from a microphone of the mobile terminal;
receiving, via the microphone, the voice input, and executing, via the controller, a particular function related to the received voice input;
if the voice recognition mode is interrupted and the microphone is deactivated while the particular function is being executed, determining, via the controller, whether the particular function is in a complete state or an incomplete state;
if the particular function is in the incomplete state, displaying, via a touchscreen of the mobile terminal, a display object informing that the particular function is in the incomplete state by a deactivation of the microphone; and
activating, via the controller, the microphone for receiving additional voice input to complete the particular function when the display object is selected by a user.

15. The method of claim 14, wherein the determining step determines that the particular function is in the incomplete state when saving, deletion or transmission of the particular function is not complete.

16. The method of claim 14, wherein the determining step determines that the particular function is in the incomplete state if at least one of a task, content, target and a presence or non-presence of a final activation for the particular function is not specified.

17. The method of claim 14, wherein the displaying step displays the display object on one of a home screen, a lock screen, a quick panel and a main menu.

18. The method of claim 14, wherein the display object includes at least one of text, an image and an icon for indicating information about the particular function previously recognized before the voice recognition mode is interrupted.

19. The method of claim 14, wherein the display object includes at least one of text, an image and an icon for indicating information about the particular function not obtained before the interruption of the voice recognition mode.

20. The method of claim 14, wherein the activating step activates the microphone when the display object is displayed on the touchscreen, or resumes the particular function and activates the microphone during a prescribed time starting from a timing point of initially displaying or selecting the display object.

* * * * *